Nov. 30, 1926.

H. R. McCLISH

LUBRICATING DEVICE

Filed June 20, 1923

1,608,797

INVENTOR.
H. R. McClish
BY
ATTORNEYS.

Patented Nov. 30, 1926.

1,608,797

UNITED STATES PATENT OFFICE.

HAROLD R. McCLISH, OF HEALDSBURG, CALIFORNIA.

LUBRICATING DEVICE.

Application filed June 20, 1923. Serial No. 646,611.

The present invention relates to improvements in lubricating devices and has particular reference to a device for forcing grease into bearings or the like under pressure. The particular object of the invention is to provide a device of this character that is very simple in construction, can be made very cheaply and is easy to manipulate.

Figure 1:
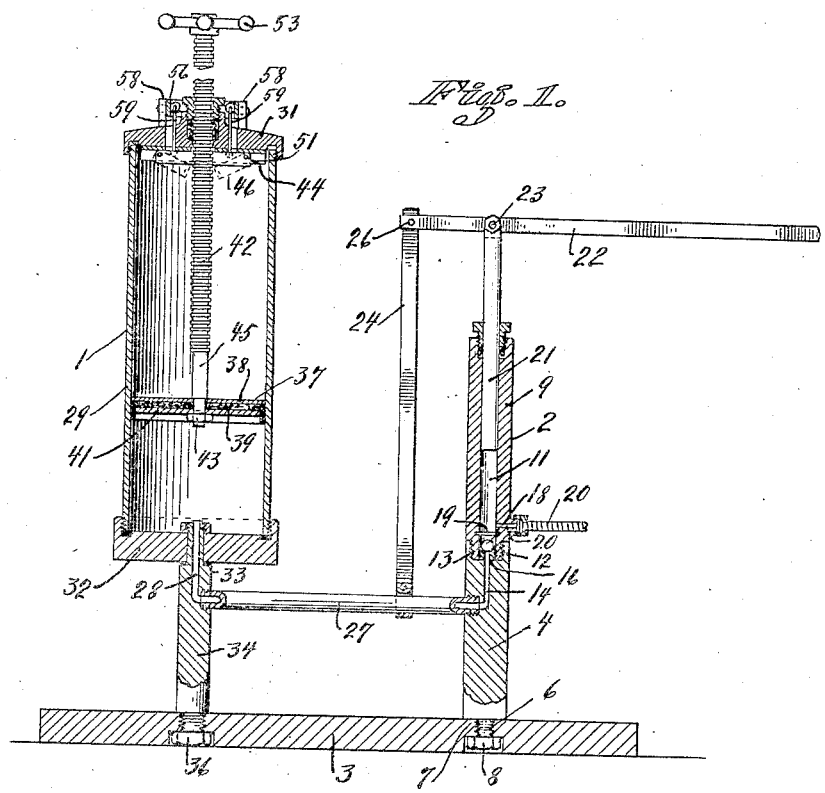
Figures 2, 3:
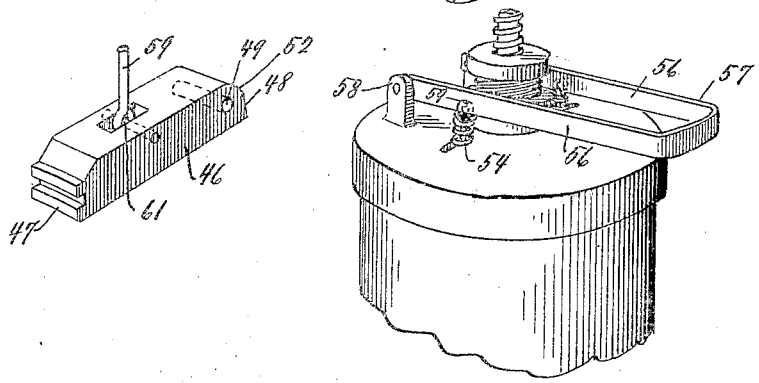

The preferred form of the invention is illustrated in the accompanying drawing in which Figure 1 shows a vertical section through my device, Figure 2 a perspective detail view of a nut section and Figure 3 a perspective view of a top portion of a supply cylinder forming part of my device. While I have shown only the preferred form of my invention, I wish to have it understood that various changes or modifications may be made within the scope of the claim hereto attached without departing from the spirit of the invention.

My lubricating device comprises in its principal features a supply cylinder (1) and a pressure cylinder (2) both of which are mounted in operative proximity on a base (3). The pressure cylinder is preferably made of two parts the lower part (4) terminating at one end in a reduced extension (6) adapted to be passed through a perforation (7) in the base and to receive the nut (8) which latter disappears in a counter sunk portion of the base. The upper part (9) is cored as shown at (11) and terminates at its lower end in a reduced threaded portion (12) adapted to be received in a threaded recess (13) of the lower member. A port (14) is provided in the lower member (4) and communicates with the core (11) through a sleeve (16) threaded into the lower portion of the upper part. The sleeve forms a seat for a ball (18) which serves as a check valve and is prevented from rising above a certain height by a pin (19). A port (20) provided above the check valve communicates with a flexible tube (20') which may be secured in any suitable manner to the point of application. A piston (21) is adapted to reciprocate in the core of the cylinder and is secured by means of a lever handle (22) engaging the piston at (23) and fulcrumed to a bar (24) as shown at (26) which latter bar is pivoted to a pipe (27) connecting the port (14) in the member (4) with a port (28) in the bottom of the supply cylinder.

The latter cylinder comprises the cylindrical member (29), the top plate (31) and the bottom plate (32) which latter rests on a shoulder (33) formed in a supporting member (34) the lower end of which extends through the base plate and is secured by means of the nut (36). A piston (37) preferably consisting of a solid disk (38) of the same diameter as the inside of the cylinder, the flexible cup (39) and holding disk (41) of smaller diameter is secured to the lower end of the rod (42) by means of the nut (43). The latter rod is threaded almost throughout its entire length, leaving only a small lower portion (45) unthreaded. The bottom face of the top plate (31) has a channel iron (44) secured thereto with its flanges pointing downwardly. The channel iron stretches diametrically across the face leaving enough space in the center to allow the rod (42) to pass thereto. In the flanges of the channel iron are supported, on opposite sides of the rod two sections (46) of a nut. One of these sections is shown in detail in Figure 2 from which it appears that the sections are threaded interiorly as shown at (47) while near their outer edges (48) they are perforated as shown at (49) to receive pins (51) on which the nut sections are hinged. The perforations (49) are disposed near the upper faces of the nut sections to prevent binding action and the edges (52) nearest the perforations (49) are rounded off as shown in the drawing. When the rod is rotated by means of the handle (53) while the two nut sections are in a horizontal position the rod will be forced downwardly causing the piston to move and to force a lubricant contained in the cylinder through the port (28) into the pressure cylinder. The reaction of the compressed lubricant on the piston serves to hold the two nut sections in their operative position as long as only a turning motion is used. But if the operator should press the piston downwardly by straight longitudinal motion the two cut sections would swing on their hinges and become disengaged from the rod. This disengaging action is opposed by springs (54) disposed between the top of the top plate and the two arms (56) of a handle (57) which latter is pivoted to two standards (58). An intermediate portion of each arm (56) has a rod (59) suspended therefrom and the lower end of each rod is pivoted to a nut section as shown at (61). While the springs (54) have a tendency to lift the two nut sections into the horizontal or operative position a slight pressure on the handle (57) may overcome this tendency and may hold the two nut sections in the inoperative position shown in dotted lines in Figure 1 thus giving the operator an opportunity to pull the piston upwardly by straight longitudinal motion.

The operation of the device should be readily understood from the foregoing description.

The supply cylinder (1) is filled with proper lubricant such as grease and the latter is forced into the force pump by turning the handle (53). When the chamber of the force pump is filled the handle (22) depressed and the grease which is prevented from returning through the pipe (27) by the check valve (18) is forced through the flexible member (20') into the bearing to be greased. When the supply cylinder is nearly empty the operator turns the handle (53) in the opposite direction for a short distance then presses the handle downward whereby the two nut sections (46) are disengaged from the rod. With one hand bearing on the handle (57) so as to hold the two nut sections in their inoperative positions the operator pulls the piston upwardly by straight longitudinal motion until the smooth portion (45) of the rod reaches the top plate. The operator then releases the handle (57) which is pressed upward by the springs (54) whereby the nuts are returned to their operative position. Turning the handle (53) to the right then reengages the threaded portion of the rod with the nut sections and after the cylinder has been re-filled the operator may continue his work.

I claim:

In a lubricating device a closure member having an aperture therethrough, a screw threaded stem passing through said aperture, a split nut carried by said closure member which may be moved into and out of operative relation with the said threaded stem and comprising a pair of opposed sections pivotally mounted on said closure member on the underside thereof, links secured to said sections and extending upwardly through said closure member, a manually operable pivoted member through which the upper ends of said links are secured, adapted to move said sections out of operative relation to said threaded stem and resilient means encircling the links, tending to hold said sections in engagement with said stems.

HAROLD R. McCLISH.